US012249787B2

(12) United States Patent
Sadakata

(10) Patent No.: US 12,249,787 B2
(45) Date of Patent: Mar. 11, 2025

(54) CONNECTOR CAPABLE OF SUPPRESSING RATTLING BETWEEN HOUSINGS

(71) Applicant: SUMITOMO WIRING SYSTEMS, LTD., Mie (JP)

(72) Inventor: Shifumi Sadakata, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 346 days.

(21) Appl. No.: 17/783,269

(22) PCT Filed: Nov. 19, 2020

(86) PCT No.: PCT/JP2020/043113

§ 371 (c)(1),
(2) Date: Jun. 8, 2022

(87) PCT Pub. No.: WO2021/117450

PCT Pub. Date: Jun. 17, 2021

(65) Prior Publication Data

US 2023/0019778 A1 Jan. 19, 2023

(30) Foreign Application Priority Data

Dec. 10, 2019 (JP) ................................ 2019-223167

(51) Int. Cl.
*H01R 13/514* (2006.01)
*H01R 13/627* (2006.01)

(52) U.S. Cl.
CPC ....... *H01R 13/514* (2013.01); *H01R 13/6272* (2013.01)

(58) Field of Classification Search
CPC ............................ H01R 13/502; H01R 13/514
USPC ........................................................ 439/345
See application file for complete search history.

(56) References Cited

U.S. PATENT DOCUMENTS 5,913,703 A * 6/1999 Suzuki ................ H01R 13/641 439/701
2009/0042445 A1 2/2009 Ichio et al.

FOREIGN PATENT DOCUMENTS

| | | | | |
|---|---|---|---|---|
| CN | 106450924 A | | 2/2017 | |
| CN | 106450924 B | * | 2/2019 | ......... H01R 13/5812 |
| JP | H11233188 A | * | 8/1999 | |
| JP | 2000-215946 A | | 8/2000 | |
| JP | 2016-051639 A | | 4/2016 | |

OTHER PUBLICATIONS

International Search Report issued on Jan. 19, 2021 for WO 2021/117450 A1 (4 pages).

* cited by examiner

*Primary Examiner* — Abdullah A Riyami
*Assistant Examiner* — Amara Anderson
(74) *Attorney, Agent, or Firm* — Venjuris, P.C.

(57) ABSTRACT

A connector is provided with a first housing, a second housing to be stacked on and coupled to the first housing and a mating housing to be connected to the first housing and the second housing. The mating housing includes a projecting portion to be arranged between first and second facing surfaces of the first housing and the second housing and capable of contacting the respective facing surfaces of the first housing and the second housing.

7 Claims, 9 Drawing Sheets

CONNECTOR CAPABLE OF SUPPRESSING RATTLING BETWEEN HOUSINGS

CROSS REFERENCE TO RELATED APPLICATIONS

This application is a national phase of PCT application No. PCT/JP2020/043113, filed on 19 Nov. 2020, which claims priority from Japanese patent application No. 2019-223167, filed on 10 Dec. 2019, all of which are incorporated herein by reference.

TECHNICAL FIELD

The present disclosure relates to a connector.

BACKGROUND

A connector disclosed in Patent Document 1 includes upper and lower female housings and upper and lower male housings. Both female housings are coupled to each other via a coupling structure. The both male housings are also coupled to each other via a coupling structure. Each of the both female housings includes a fit-in portion. Each of the both male housings includes a receptacle. The fit-in portions of the both female housings are inserted into the receptacles of the both male housings. Close contact parts of the receptacles enter an allowing space between the both fit-in portions. Patent Document 2 discloses a joint connector configured by stacking a plurality of sub-housings in a vertical direction.

PRIOR ART DOCUMENT

Patent Document

Patent Document 1: JP H11-233188 A
Patent Document 2: JP 2009-054472 A

SUMMARY OF THE INVENTION

Problems to be Solved

In the case of Patent Document 1, there are gaps between the close contact parts of the receptacles and the both fit-in portions and the respective coupling structures of the both female housings and the both male housings may rattle in the vertical direction (stacking direction). Thus, vertical rattling cannot be sufficiently suppressed between the both female housings and between the both male housings.

Accordingly, the present disclosure aims to provide a connector capable of suppressing rattling between housings.

Means to Solve the Problem

The present disclosure is directed to a connector with a first housing, a second housing stacked on and coupled to the first housing, and a mating housing to be connected to the first and second housings, the mating housing including a projecting portion to be arranged between facing surfaces of the first and second housings and capable of contacting the respective facing surfaces of the first and second housings.

Effect of the Invention

According to the present disclosure, it is possible to provide a connector capable of suppressing rattling between housings.

DETAILED DESCRIPTION TO EXECUTE THE INVENTION

Description of Embodiments of Present Disclosure

Figure 1:
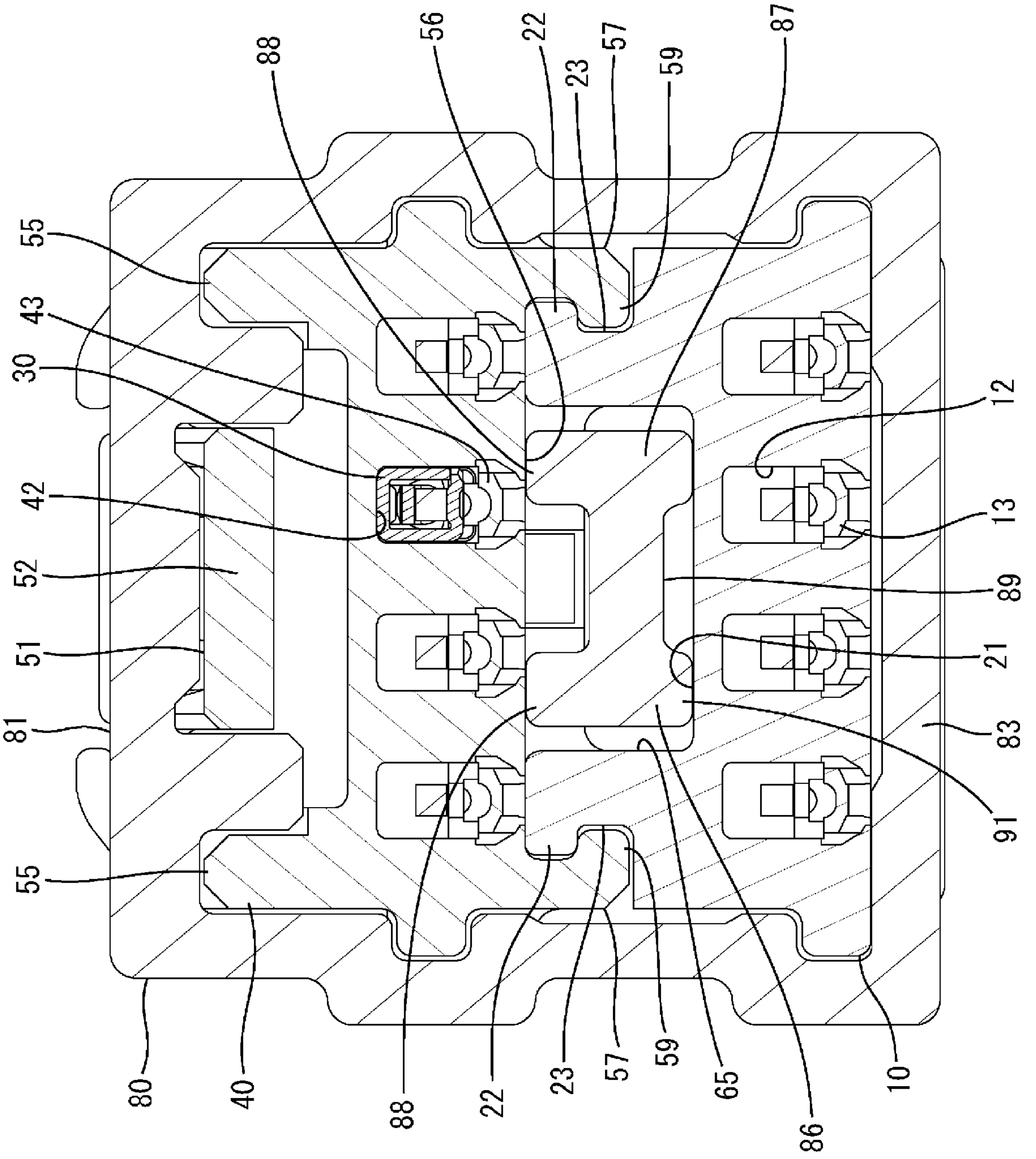
FIG. 1 is a lateral section when a connector according to one embodiment is in a connected state.

First, embodiments of the present disclosure are listed and described.

(1) The connector of the present disclosure is provided with a first housing, a second housing stacked on and coupled to the first housing, and a mating housing to be connected to the first and second housings, the mating housing including a projecting portion to be arranged between facing surfaces of the first and second housings and capable of contacting the respective facing surfaces of the first and second housings. According to this configuration, a gap between the facing surfaces of the first and second housings is filled by the projecting portion in a stacking direction (facing direction) of the first and second housings. As a result, rattling between the first and second housings can be suppressed.

(2) Preferably, the first housing includes a deflectable and deformable housing lock portion for locking the second housing and restricting mutual separation of the first and second housings, the first and second housings include a deflection space for the housing lock portion between the facing surfaces, and the projecting portion has a part to be arranged in the deflection space. By arranging the projecting portion in the deflection space, the deflection of the housing lock portion is hindered and a locking state of the housing lock portion can be maintained. Further, by the interference of the projecting portion with the housing lock portion deflected and deformed into the deflection space, it can be detected that locking for the second housing has not been completed yet. As a result, locking reliability by the housing lock portion can be enhanced. Particularly, since the projecting portion has a function of enhancing locking reliability in addition to a function of suppressing rattling, a configuration can be simplified as compared to the case where parts for achieving the both functions are separately provided.

(3) The first housing may include a deflectable and deformable housing lock portion for locking the second housing and restricting mutual separation of the first and second housings, the housing lock portion may be arranged in a rear part of a space between the facing surfaces, and a part of the projecting portion capable of contacting the facing surfaces may be arranged in a front part of the space between the facing surfaces. By arranging the housing lock portion in the rear part of the space between the facing surfaces, the front part of the space between the facing surfaces may become a dead space. However, according to the above configuration, the front part of the space between the facing surfaces is utilized as an arrangement space for the projecting portion, space efficiency is excellent.

(4) The mating housing may include a receptacle, the first and second housings being arranged inside the receptacle, the projecting portion and a male terminal fitting may be arranged to project into the receptacle, and a tip of the projecting portion may be arranged forward of a tip of the male terminal fitting. According to this configuration, if the first and second housings are inserted into the receptacle while taking an inclined posture, the projecting portion can interfere with the first and second housings. As a result, the contact of the first and second housings with the male terminal fitting can be avoided and the damage of the male terminal fitting can be avoided. Particularly, since the projecting portion has a function of preventing pry connection described above in addition to the function of suppressing rattling, the configuration can be simplified as compared to the case where parts for achieving the both functions are separately provided.

(5) Either one of the first and second housings may include a deflectable and deformable lock portion for locking the mating housing and holding a connected state to the mating housing, and the projecting portion may be arranged to face the lock portion in a deflecting direction of the lock portion. According to this configuration, either one of the first and second housings is stably held between the receptacle and the projecting portion via the lock portion.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

Embodiment

Figure 2:
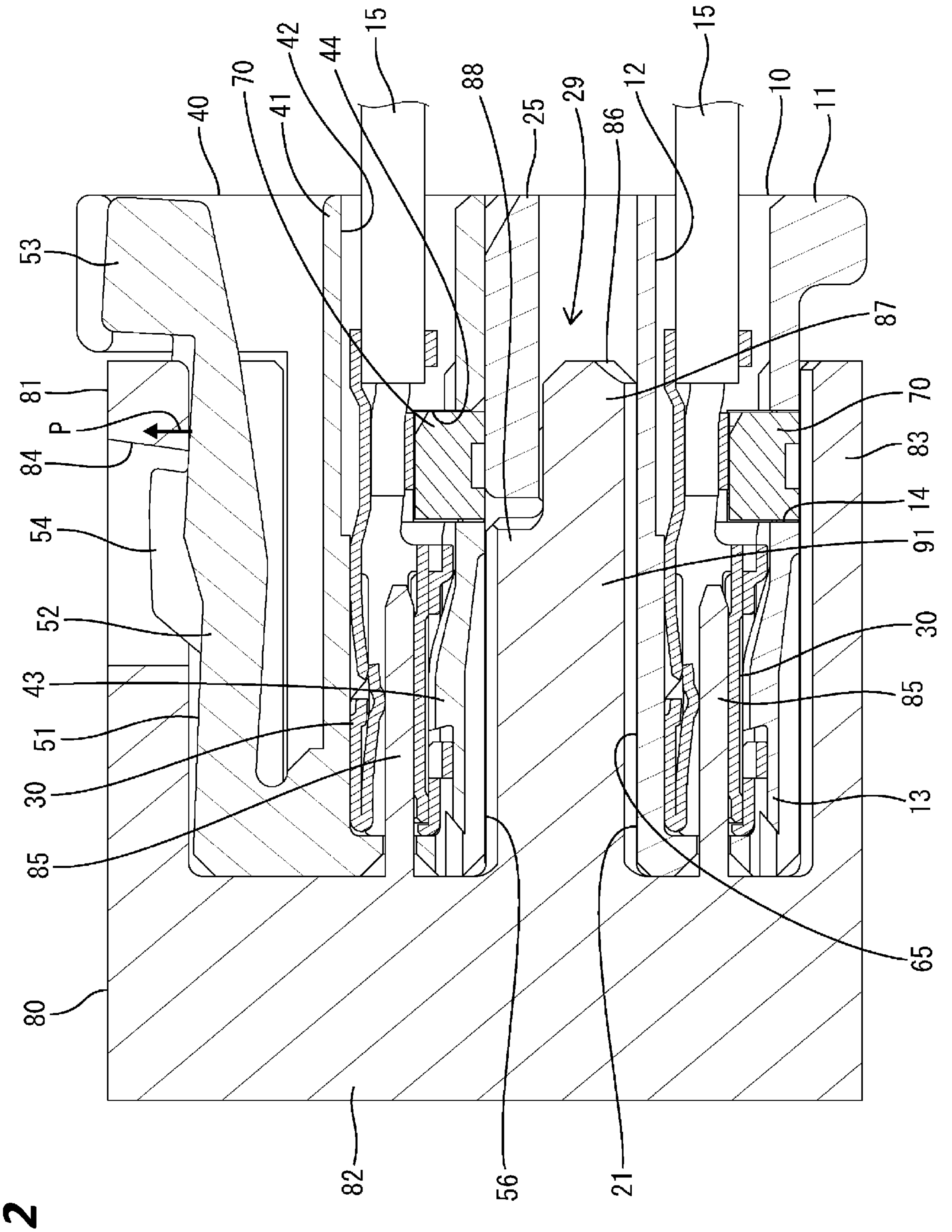
FIG. 2 is a side view in section when the connector is in the connected state.
Figure 3:
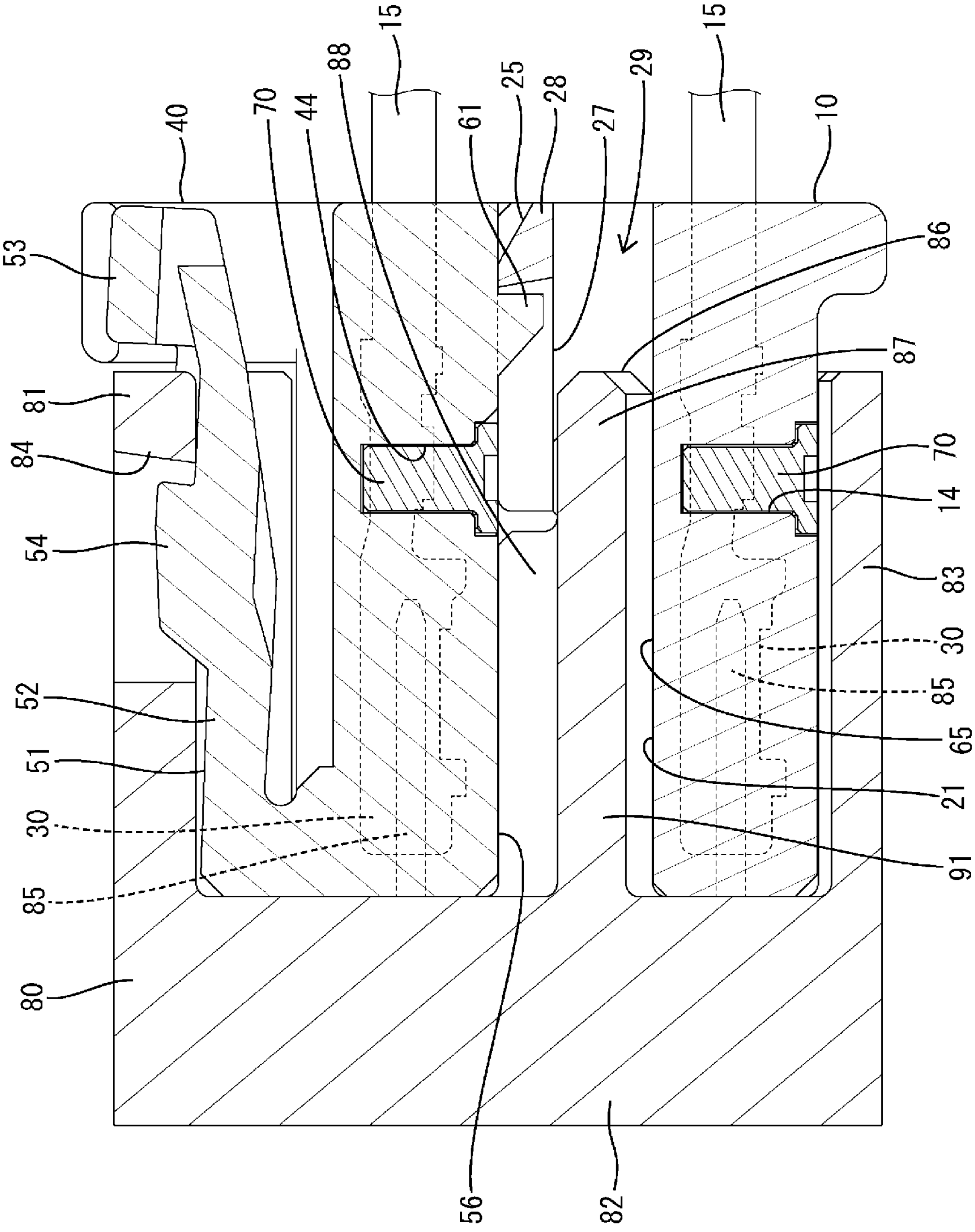
FIG. 3 is another side view in section when the connector is in the connected state.
Figure 4:
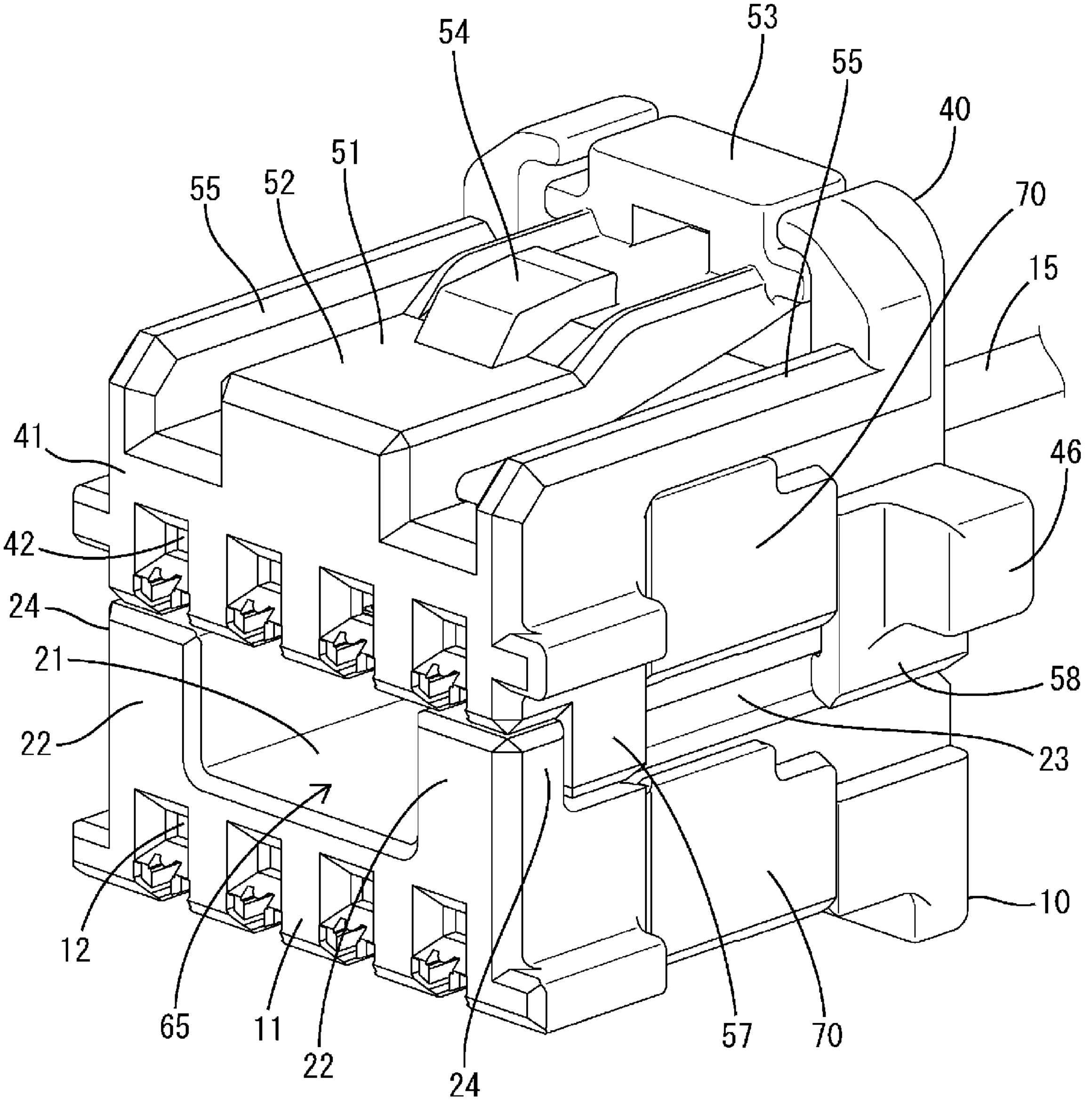
FIG. 4 is a perspective view when first and second housings are in a coupled state.

A connector 1 of one embodiment includes a first housing 10, a second housing 40 and a mating housing 80 as shown in FIGS. 1 to 3. As shown in FIG. 4, the first and second housings 10, 40 are coupled to each other. The mating housing 80 is an inseparable single housing (see FIG. 5) and connectable to the first and second housings 10, 40 in a coupled state (united state). Note that, in the following description, surface sides facing each other when the connection of the first and second housings 10, 40 and the mating housing 80 is started are referred to as front sides.

Mating Housing

Figure 5:
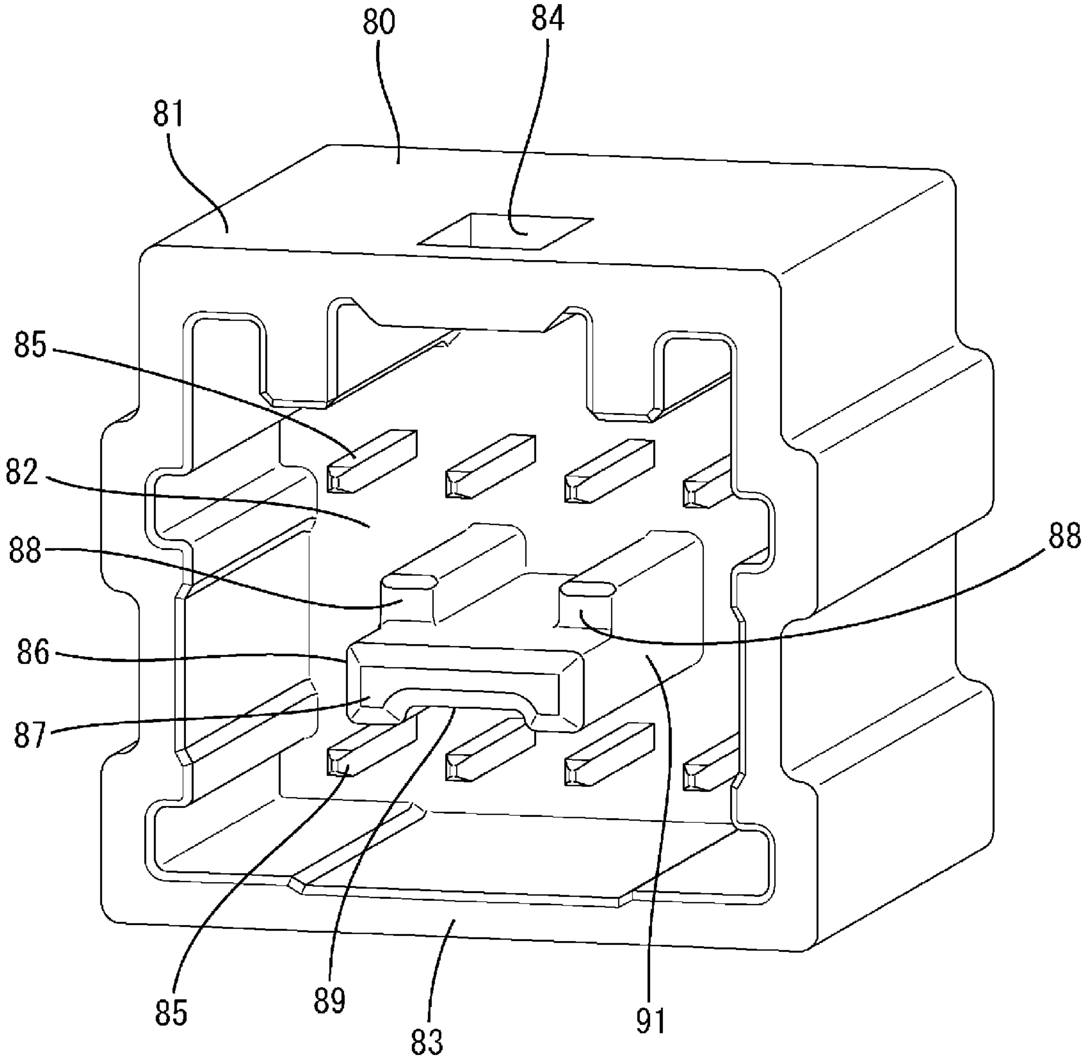
FIG. 5 is a perspective view of a male housing having terminals mounted therein.
Figure 6:
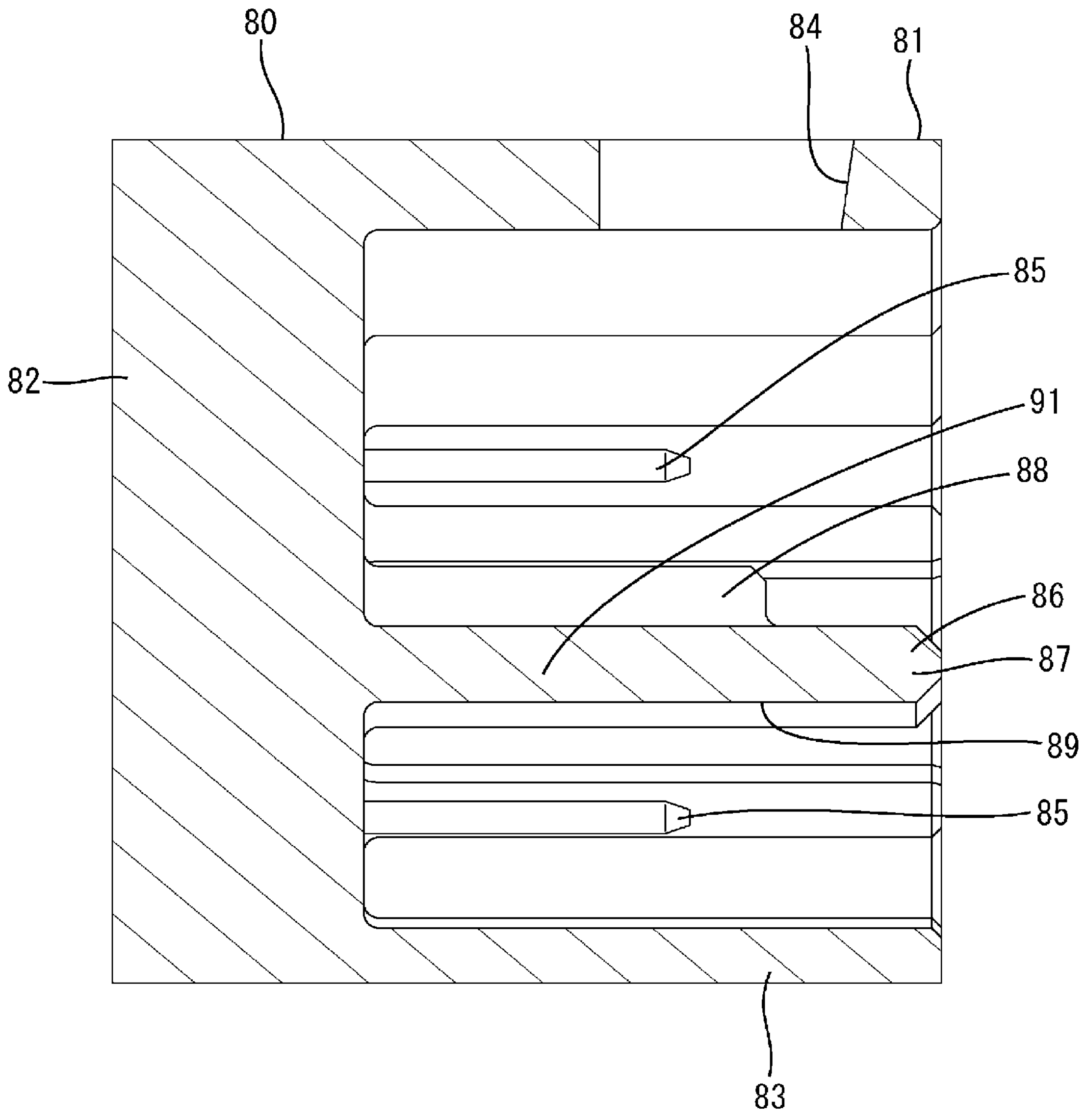
FIG. 6 is a side view in section of the male housing having the terminals mounted therein.

The mating housing 80 is made of synthetic resin and includes, as shown in FIGS. 5 and 6, a receptacle 81 in the form of a rectangular tube. The receptacle 81 has a back wall 82 in the form of a rectangular plate and a peripheral wall 83 in the form of a rectangular tube projecting forward from the outer edge of the back wall 82. The peripheral wall 83 includes a vertically penetrating lock hole 84 in an intermediate part in a width direction of an upper wall part.

A plurality of male terminal fittings 85 (tabs) are arranged to project into the receptacle 81. The respective mating housings 85 are passed through the back wall 82 and arranged in a plurality of columns in the width direction and in two rows in a vertical direction.

Further, one projecting portion 86 is arranged to project between the male terminal fittings 85 in the upper row and those in the lower row in the receptacle 81. The projecting portion 86 is shaped to project from a widthwise intermediate part of the front surface of the back wall 82. The tip (front end) of the projecting portion 86 is arranged forward of (in front of) the tip of each male terminal fitting 85. The tip of the projecting portion 86 is arranged at the same position as the tip (opening end) of the receptacle 81.

The projecting portion 86 includes a projecting body 87 in the form of a rectangular plate along the width direction and a pair of ridge portions 88 projecting on both widthwise ends of the upper surface of the projecting body 87. Each ridge portion 88 is in the form of a rib extending in a front-rear direction and has a rectangular cross-sectional shape. The rear end of each ridge portion 87 is connected to the back wall 82. The front end of each ridge portion 88 is arranged rearward of the front end of the projecting body 87. The tip of each ridge portion 88 is arranged forward of the tip of each male terminal fitting 85. The upper surface of each ridge portion 88 is arranged to be flat in the front-rear direction and width direction. The lower surface of the projecting body 87 has a recess 89 in a widthwise intermediate part. The recess 89 is in the form of a shallow groove and recessed over the entire length in the front-rear direction in the lower surface of the projecting body 87. A part of the lower surface of the projecting body 87 except the recess 89 is arranged to be flat in the front-rear direction and width direction. Note that a rear part of the projecting portion 86 including the respective ridge portions 88 is a part capable of contacting first and second facing surfaces 21, 56 to be described later, and is referred to a rattling suppressing portion 91 below.

First Housing

Figure 7:
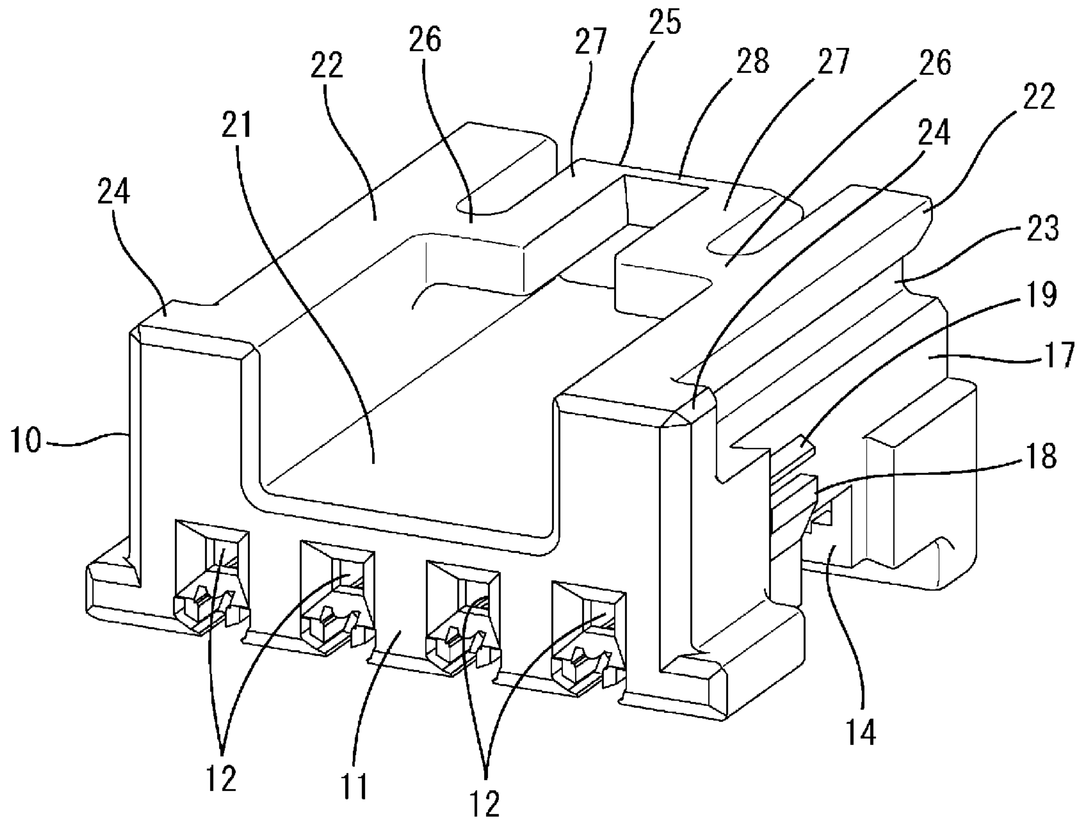
FIG. 7 is a perspective view of the first housing.

The female housing 10 is made of synthetic resin and, as shown in FIG. 4, arranged below the second housing 40. As shown in FIG. 7, the first housing 10 includes a flat first housing body 11 extending in the width direction. The first housing body 11 includes a plurality of first cavities 12 penetrating in the front-rear direction. The plurality of first cavities 12 are respectively arranged side by side in a row in the width direction to correspond to the respective male terminal fittings 85 in the lower row in the first housing body 11. As shown in FIG. 2, a deflectable first locking lance 13 is provided to project on the lower wall of each first cavity 12. Each first locking lance 13 is exposed on the lower surface of the first housing body 11.

As shown in FIG. 2, a first mounting hole 14 is provided open in an intermediate part in the front-rear direction of the lower surface of the first housing body 11. The first mounting hole 14 communicates with each first cavity 12.

A terminal fitting 30 is inserted into each first cavity 12. The terminal fitting 30 is locked and primarily retained by the first locking lance 13. Further, the terminal fitting 30 is locked and secondarily retained by a retainer 70 inserted into the first mounting hole 14.

The terminal fitting 30 is crimped and connected to a wire 15. The wire 15 is pulled out to outside from the rear surface of the first housing 10. A tip part of the male terminal fitting 85 is inserted into a box portion of the terminal fitting 30 and connected. The retainer 70 is of such a size as to be insertable into the first mounting hole 14. The retainer 70 is assembled movably between a partial locking position and a full locking position with respect to the first housing 10. When the retainer 70 is at the partial locking position, locking parts of the retainer 70 are retracted from the first cavities 12 to allow an inserting operation of the terminal fittings 30 into the first cavities 12. When the retainer 70 is at the full locking position, the locking parts of the retainer 70 enter the first cavities 12 and the terminal fittings 30 inserted into the first cavities 12 are lockable by the retainer 70.

The first housing body 11 includes a partial locking portion 18 and a full locking portion 19 on a recessed surface portion 17 recessed from surroundings on each of both side surfaces as shown in FIG. 7. The partial locking portion 18 and the full locking portion 19 are in the form of projections and arranged in front of and above the first mounting hole 14 on the recessed surface portion 17. The full locking portion 19 is arranged above the partial locking portion 18 on the recessed surface portion 17. The retainer 70 is held at the partial locking position with respect to the first housing 10 by being locked by the partial locking portions 18. The retainer 70 is held at the full locking position with respect to the first housing 10 by being locked by the full locking portions 19.

The upper surface of the first housing body 11 is configured as the first facing surface 21 facing the second housing 40. The first housing 10 includes a pair of side portions 22 projecting from both widthwise ends of the first facing surface 21 of the first housing body 11. The both side portions 22 project over the entire length in the front-rear direction on the first housing body 11.

Lock receiving portions 23 in the form of recessed grooves are provided on outer side surfaces of the both side portions 22. The lock receiving portion 23 extends in the front-rear direction and has a rectangular cross-sectional shape. The rear end of the lock receiving portion 23 is open in the rear surface of the side portion 22. The both side portions 22 include deviation preventing portions 24 in front of the lock receiving portions 23 and protruding laterally. The rear surface of the deviation preventing portion 24 is arranged along the vertical direction and serves as a closing surface for closing the front end of the lock receiving portion 23.

As shown in FIG. 7, the first housing 10 includes a housing lock portion 25 shaped to extend between the upper ends of rear parts of the both side portions 22. The housing lock portion 25 includes a pair of fulcrum portions 26 connected to the inner surfaces of the upper ends of the rear parts of the both side portions 22, a pair of extending portions 27 extending rearward from the inner ends of the respective fulcrum portions 26 and a lock body portion 28 linking between the rear ends of the respective extending portions 27. The upper surface of the housing lock portion 25 is continuous with the upper surfaces of the both side portions 22 without any step. The upper surface of the housing lock portion 25 and those of the both side portions 22 are formed to be flat along the front-rear direction and lateral direction. The first facing surface 21 described above is also formed to be flat along the front-rear direction and lateral direction.

The housing lock portion 25 is deflected and deformed with the respective fulcrum portions 26 as fulcrums. As shown in FIG. 3, a deflection space 29 is provided between the first facing surface 21 of the first housing body 11 and the housing lock portion 25. The lock body portion 28 is displaced toward the deflection space 29 when the housing lock portion 25 is deflected and deformed.

Second Housing

Figure 8:
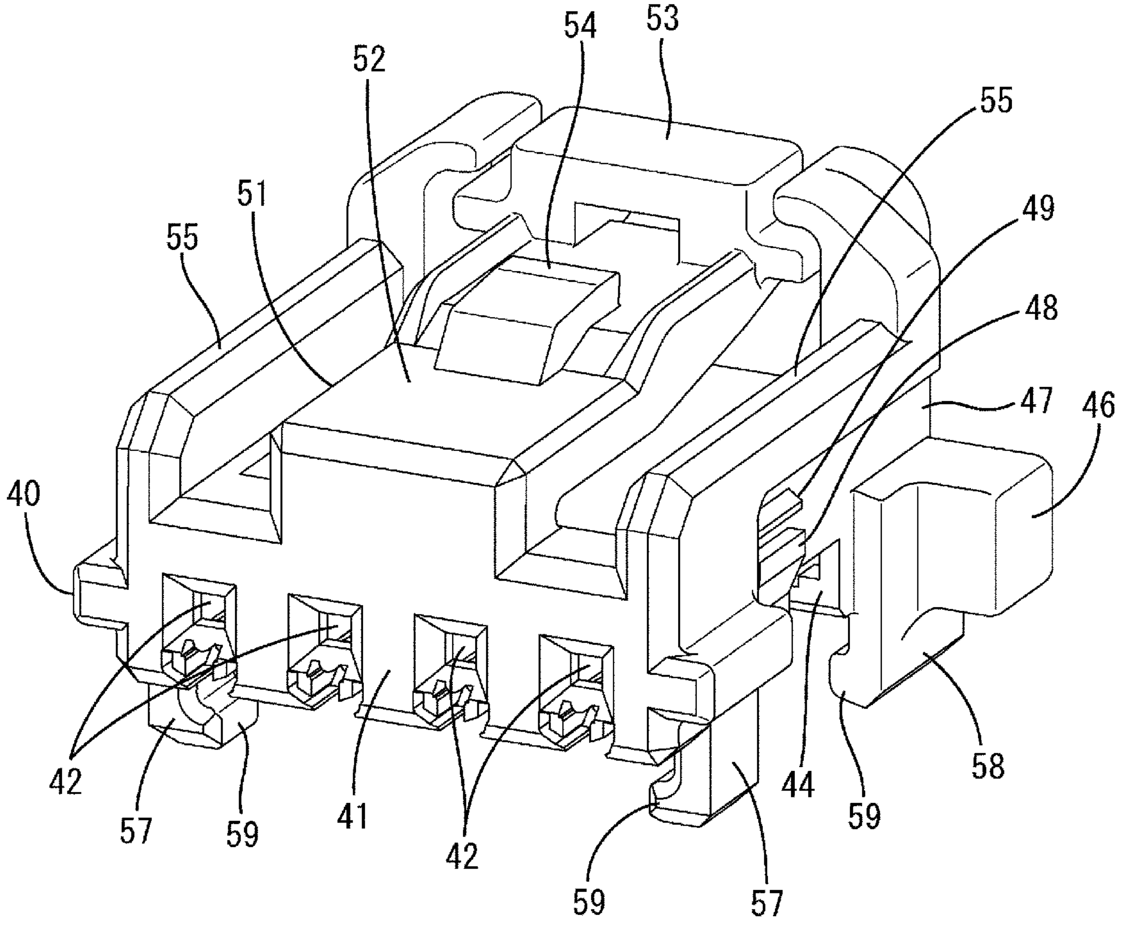
FIG. 8 is a perspective view of the second housing.
Figure 9:
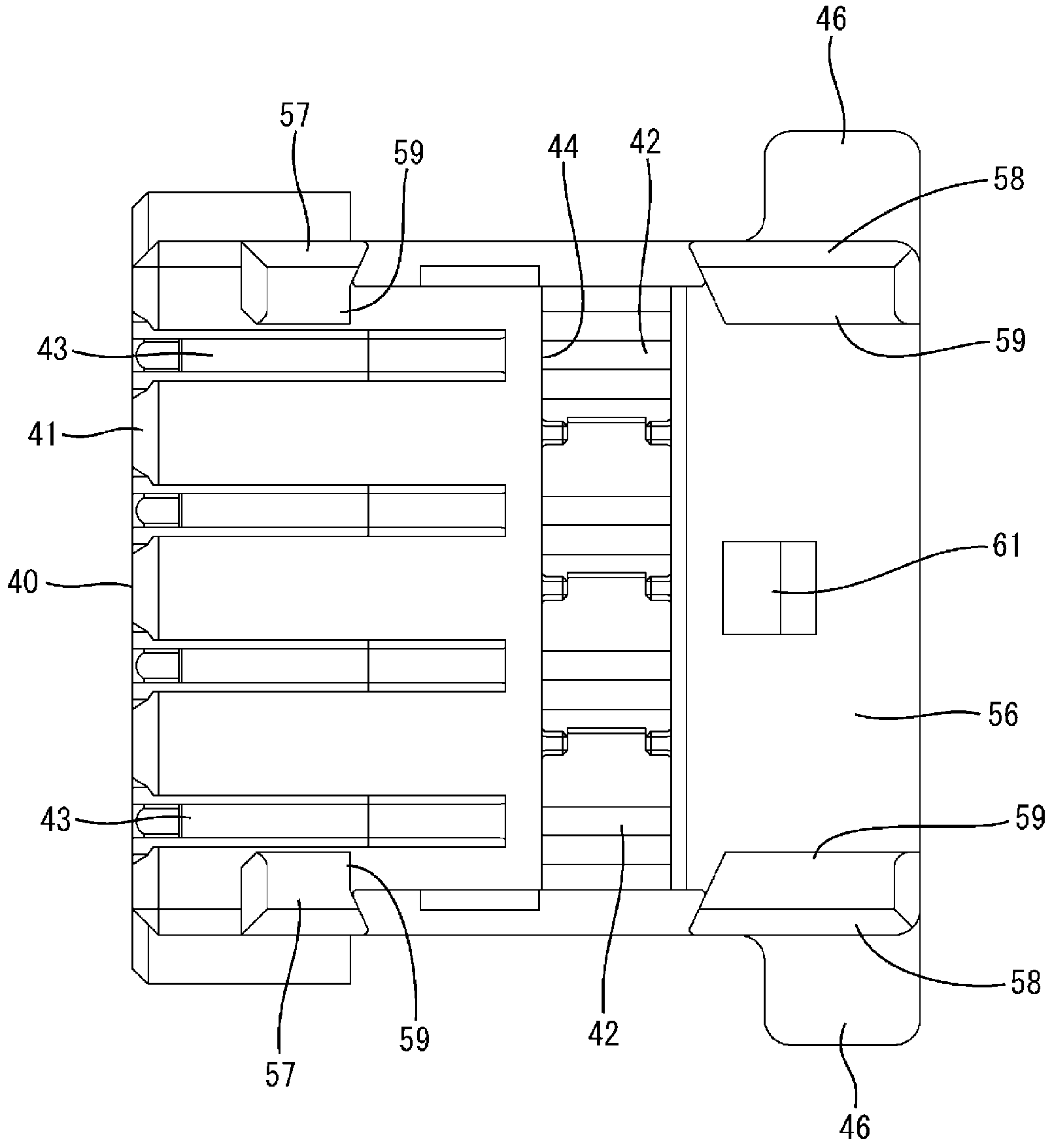
FIG. 9 is a bottom view of the second housing.

The second housing 40 is made of synthetic resin and, as shown in FIG. 4, arranged above the first housing 10. As shown in FIGS. 8 and 9, the second housing 40 includes a flat second housing body 41 extending in the width direction. The second housing body 41 includes a plurality of second cavities 42 penetrating in the front-rear direction. The plurality of second cavities 42 are respectively arranged side by side in a row in the width direction to correspond to the respective male terminal fittings 85 in the upper row in the second housing body 41. As shown in FIG. 2, a deflectable second locking lance 43 is provided to project on the lower wall of each second cavity 42. As shown in FIG. 9, each second locking lance 43 is exposed on the lower surface (second facing surface 56 to be described later) of the second housing body 41.

A second mounting hole 44 is provided open in an intermediate part in the front-rear direction of the lower surface of the second housing body 41. The second mounting hole 44 communicates with each second cavity 42.

A terminal fitting 30 is inserted into each second cavity 42 as shown in FIG. 2. The terminal fitting 30 is locked and primarily retained by the second locking lance 43. Further, the terminal fitting 30 is locked and secondarily retained by a retainer 70 inserted into the second mounting hole 44.

The shapes of the terminal fittings 30 and the retainer 70 are similar to those of the terminal fittings 30 and the retainer 70 to be mounted into the first housing 10. Further, recessed surface portions 47, partial locking portions 48 and full locking portions 49 are provided on both side surfaces of the second housing body 41 as shown in FIG. 8 and the shapes of these are also similar to those of the recessed surface portions 17, the partial locking portions 18 and the full locking portions 19 provided in the first housing 10.

The second housing 40 includes a pair of outward projecting portions 46 protruding laterally from both side surfaces of the second housing body 41. The outward projecting portion 46 is in the form of a rectangular prism.

As shown in FIG. 8, the second housing 40 includes a lock portion 51 shaped to project from the upper surface of the second housing body 41. The lock portion 51 includes a cantilevered arm body 52 extending rearward from a front end part of the upper surface of the housing body 41. A releasing portion 53 is provided on a rear end part of the arm body 52. A lock projection 54 is provided to project upward in an interference part in the front-rear direction of the arm body 52. A pair of peripheral walls 55 are provided to stand on both widthwise ends of the upper surface of the second housing body 41.

The lower surface of the second housing body 41 is configured as the second facing surface 56 facing the first housing 10. The second facing surface 56 is formed to be flat along the front-rear direction and lateral direction. As shown in FIG. 9, the second housing 40 includes a pair of front locking portions 57 and a pair of rear locking portions 58 projecting downward from both widthwise ends of the second facing surface 56 of the second housing body 41. The front locking portions 57 are in the form of plate pieces extending in the front-rear direction and arranged on a front end side of the second housing 40. The rear locking portions 58 are similarly in the form of plate pieces extending in the front-rear direction and arranged on a rear end side of the second housing 40. The second mounting hole 44 is open between the front locking portions 57 and the rear locking portions 58 in the second housing body 41. As shown in FIG. 8, each locking portion 57, 58 includes a locking claw 59 bent inwardly on a lower end.

A housing locked portion 61 is provided on the second facing surface 56 of the second housing body 41. The housing locked portion 61 is in the form of a projection and arranged behind the second mounting hole 44 in an intermediate part in the front-rear direction of the second facing surface 56 of the second housing body 41. As shown in FIG. 3, the rear surface of the housing locked portion 61 is arranged along the vertical direction. The front surface of the housing locked portion 61 is inclined rearward. The housing locked portion 61 is lockable by the lock body portion 28 of the housing lock portion 23.

Connection Structure of Connector

Prior to the connection of the mating housing 80 and the first and second housings 10, 40, the terminal fittings 30 and the retainers 70 are mounted into the first and second housings 10, 40. The retainers 70 are held at the full locking position by the full locking portions 19, whereby the terminal fittings 30 are retained and held in the first and second housings 10, 40. Subsequently, the second housing 40 is slid from behind and mounted on the first housing 10. The locking claws 59 of the respective locking portions 57, 58 are fit and inserted into the respective lock receiving portions 23 from behind (see FIG. 1). The front locking portions 57 butt against the closing surfaces of the deviation preventing portions 24 (front ends of the lock receiving portions 23), whereby a forward movement of the second housing 40 with respect to the first housing 10 is stopped (see FIG. 4).

In a final stage of the process of sliding the second housing 40 on the first housing 10, the housing locked portion 61 interferes with the lock body portion 28 and the housing lock portion 25 is deflected and deformed into the deflection space 29. As the locking claws 59 of the locking portions 57 butt against the closing surfaces of the deviation preventing portions 24, the housing lock portion 25 is resiliently restored and the lock body portion 28 is lockably arranged to face the rear surface of the housing locked portion 61 (see FIG. 3). In this way, the second housing 40 is restricted from being separated rearward from the first housing 10.

As described above, the second housing 40 is restricted from moving in the front-rear direction with respect to the first housing 10 by the abutment of the deviation preventing portions 24 and the locking of the housing lock portion 25. Particularly, forward deviation of the second housing 40 with respect to the first housing 10 is reliably restricted. As a result, the front surface positions of the respective first and second housings 10, 40 can be aligned and any of effective contact margins when the respective terminal fittings 30 in the upper and lower rows contact the corresponding male terminal fittings 85 can be ensured to be satisfactory. Further, by the abutment of the locking claws 59 of the locking portions 57, 58 on the inner upper and lower surfaces of the lock receiving portions 23, the separation of the first and second housings 10, 40 in the vertical direction is also restricted (see FIG. 4).

When the first and second housings 10, 40 are in a coupled state, the housing lock portion 25 and the deflection space 29 are arranged in a rear part of a space between the first and second facing surfaces 21, 56. A front part of the space between the first and second facing surfaces 21, 56 is open as an insertion space 65 for allowing the insertion of the rattling suppressing portion 91 (see FIG. 4). Both widthwise ends of the insertion space 65 are closed by the both side portions 22. The front end of the insertion space 65 is open in the front surface of the first housing 10.

Subsequently, the first and second housings 10, 40 in the coupled state are inserted into the receptacle 81 of the mating housing 80. In the process of inserting the first and second housings 10, 40, the lock projection 54 interferes with the front end of the upper wall part of the receptacle 81 and the arm body 52 of the lock portion 51 is deflected and deformed downward. When the first and second housings 10, 40 are properly inserted (fit) into the receptacle 81, the arm body 52 is displaced in a return direction and the lock projection 54 is fit into the lock hole 84 of the receptacle 81. In this way, the first and second housings 10, 40 and the mating housing 80 are held in a connected state. Here, the second housing 40 is sandwiched between the arm body 52 of the lock portion 51 and the projecting portion 86, and the arm body 52 contacts the upper wall part of the receptacle 81 while applying a preload P (force in an arrow direction of FIG. 2) to the upper wall part.

In the connected state of the first and second housings 10, 40 to the mating housing 80, rear end parts of the first and second housings 10, 40 are exposed to outside from the opening end of the receptacle 81 (see FIGS. 2 and 3). The outward projecting portions 46 and the releasing portion 53 are arranged in proximity to the opening end of the receptacle 81 to abut on this opening end. The connected state of the first and second housings 10, 40 and the mating housing 80 can be released by pressing the releasing portion 53 downward.

In the process of inserting the first and second housings 10, 40 into the receptacle 81, the projecting portion 86 enters between the first and second facing surfaces 21, 56. At this time, the upper surface of each ridge portion 88 can slide along the second facing surface 56. If the first and second housings 10, 40 are properly inserted into the receptacle 81, a tip part of the projecting portion 86 (tip part of the projecting body 87 forward of the rattling suppressing portion 91) reaches the rear part of the space between the first and second facing surfaces 21, 56 and enters the deflection space 29. The tip part of the projecting portion 86 is arranged to face and abut on the lower surface of each extending portion 27 of the housing lock portion 25 in the deflection space 29. Thus, the housing lock portion 25 is restricted from being deflected and deformed toward the deflection space 29 and mutual separation of the first and second housings 10, 40 is reliably hindered.

If the housing lock portion 25 does not properly lock the housing locked portion 61, a deflected state of the housing lock portion 25 is not cancelled and each extending portion 27 and the lock body portion 28 are arranged in the deflection space 29. Thus, in the process of inserting the first and second housings 10, 40 into the receptacle 81, the tip of the projecting portion 86 interferes with each extending portion 27 and an inserting operation of the first and second housings 10, 40 is restricted. Thus, by the restricted inserting operation of the first and second housings 10, 40, it can be detected that the housing lock portion 25 does not properly lock the housing locked portion 61 and the first and second housings 10, 40 are in a separable state.

Further, if the first and second housings 10, 40 are properly inserted into the receptacle 81, the rattling suppressing portion 91 enters the insertion space 65 (front part of the space between the first and second facing surfaces 21, 56). Here, the upper surface of each ridge portion 88 is arranged to contactably face the second facing surface 56 (see FIGS. 1 to 3). Further, a part of the lower surface of the projecting portion 86 except the recess 89 is arranged to contactably face the first facing surface 21. Thus, the insertion space 65 is filled by the rattling suppressing portion 91 with respect to the vertical direction (stacking or facing direction of the first and second housings 10, 40). Further, as described above, the rear part of the space between the first and second facing surfaces 21, 56 is also filled by the housing lock portion 25 and the tip part of the projecting portion 86 with respect to the vertical direction. Thus, the gap between the first and second facing surfaces 21, 56 is filled by the projecting portion 86 and the rattling of the first and second housings 10, 40 in the vertical direction can be suppressed in the connector connected state.

On the other hand, if the first and second housings 10, 40 are inserted into the receptacle 81 while taking a posture inclined with respect to the front-rear direction, the first and second housings 10, 40 butt against the tip of the projecting portion 86 and the inserting operation of the first and second housings 10, 40 is stopped. By the abutment of the first and second housings 10, 40 on the projecting portion 86, the interference of the first and second housings 10, 40 with tip parts of the respective male terminal fittings 85 is avoided. As a result, the breakage and damage of the respective male terminal fittings 85 can be prevented.

As described above, since the gap between the first and second facing surfaces 21, 56 is filled by the projecting portion 86 according to this embodiment, rattling between the first and second housings 10, 40 can be suppressed.

Further, by the interference of the projecting portion 86 with the housing lock portion 25 deflected and deformed into the deflection space 29, it can be detected that the locking of the housing lock portion 25 with the second housing 40 has not been completed yet. As a result, locking reliability by the housing lock portion 25 can be enhanced. Particularly, since the projecting portion 86 has a function of enhancing locking reliability in addition to a function of suppressing rattling, a configuration can be simplified as compared to the case where parts for achieving the both functions are separately provided.

Moreover, since the housing lock portion 25 is arranged in the rear part of the space between the first and second facing surfaces 21, 56 and the rattling suppressing portion 91 is arranged in the insertion space 65 (front part of the space between the first and second facing surfaces 21, 56), front and rear spaces between the first and second facing surfaces 21, 56 are effectively utilized and space efficiency is excellent.

Further, if the first and second housings 10, 40 are inserted into the receptacle 81 while taking an inclined posture, the projecting portion 86 interferes with the first and second housings 10, 40. Thus, the projecting portion 86 has a function of preventing pry connection of the connector in addition to the function of suppressing rattling and the function of enhancing locking reliability described above. By such multifunctionalization of the projecting portion 86, the overall configuration can be more simplified.

Further, in the case of this embodiment, the projecting portion 86 is arranged to face the lock portion 51 below (deflecting direction) the lock portion 51 in the connector connected state. Particularly, the lock portion 51 applies the preload P to the upper wall part of the receptacle 81. Thus, the second housing 40 is stably held between the upper wall part of the receptacle 81 and the projecting portion 86.

Other Embodiments

The embodiment disclosed this time should be considered illustrative in all aspects, rather than restrictive.

Although the tip part of the projecting portion is arranged in the deflection space in the case of the above embodiment, the projecting portion may not have the tip part to be arranged in the deflection space as another embodiment.

Although the lock portion is provided in the second housing in the case of the above embodiment, the lock portion may be provided in the first housing as another embodiment.

Although the housing lock portion is arranged in the rear part of the space between the first and second facing surfaces in the case of the above embodiment, the housing lock portion may be arranged in a part other than the space between the first and second facing surfaces as another embodiment. Further, it is also possible to omit the housing lock portion. If the housing lock portion is omitted, the housing locked portion can also be omitted.

Although only the first and second housings are stacked in the vertical direction in the case of the above embodiment, housing(s) other than the first and second housings may be included and these housings may be stacked in three or more stages in the vertical direction.

Although the mating housing is a male housing including the receptacle and the first and second housings are female housings to be inserted into the receptacle in the case of the above embodiment, the first and second housings may be male housings including a receptacle (including a case where the receptacle is separate from the first and second housings) and the mating housing may be a female housing to be fit into the receptacle as another embodiment.

| List of Reference Numerals | |
|---|---|
| 10 | first housing |
| 11 | first housing body |
| 12 | first cavity |
| 13 | first locking lance |
| 14 | first mounting hole |
| 15 | wire |
| 17, 47 | recessed surface portion |
| 18, 48 | partial locking portion |
| 19, 49 | full locking portion |
| 21 | first facing surface (facing surface) |
| 22 | side portion |
| 23 | lock receiving portion |
| 24 | deviation preventing portion |
| 25 | housing lock portion |
| 26 | fulcrum portion |
| 27 | extending portion |
| 28 | lock body portion |
| 29 | deflection space |
| 30 | terminal fitting |
| 40 | second housing |
| 41 | second housing body |
| 42 | second cavity |
| 43 | second locking lance |
| 44 | second mounting hole |
| 46 | outward projecting portion |
| 51 | lock portion |

-continued

| List of Reference Numerals | |
|---|---|
| 52 | arm body |
| 53 | releasing portion |
| 54 | lock projection |
| 55 | protection wall |
| 56 | second facing surface (facing surface) |
| 57, 58 | locking portion |
| 59 | locking claw |
| 61 | housing locked portion |
| 65 | insertion space |
| 70 | retainer |
| 80 | mating housing |
| 81 | receptacle |
| 82 | back wall |
| 83 | peripheral wall |
| 84 | lock hole |
| 85 | male terminal fitting |
| 86 | projecting portion |
| 87 | projecting body |
| 88 | ridge portion |
| 89 | recess |
| 91 | rattling suppressing portion |
| P | preload |

What is claimed is:

1. A connector, comprising:

a first housing;

a second housing stacked on and coupled to the first housing; and a mating housing to be connected to the first and second housings, wherein the mating housing includes a projecting portion to be arranged between facing surfaces of the first and second housings and capable of contacting the respective facing surfaces of the first and second housings, the first housing includes a deflectable and deformable housing lock portion for locking the second housing and restricting mutual separation of the first and second housings, and when the mating housing and the first and second housings are in a connected state, a portion of the projecting portion between the housing lock portion and the facing surface of the first housing abuts on a lower surface of the housing lock portion such that deflection of the housing lock portion is restricted.

2. The connector of claim 1, wherein:

the first and second housings include a deflection space for the housing lock portion between the facing surfaces, and the projecting portion has a part to be arranged in the deflection space.

3. The connector of claim 1, wherein:

the housing lock portion is arranged in a rear part of a space between the facing surfaces, and a part of the projecting portion capable of contacting the facing surfaces is arranged in a front part of the space between the facing surfaces.

4. The connector of claim 1, wherein:

the mating housing includes a receptacle, the first and second housings being arranged inside the receptacle, the projecting portion and a male terminal fitting are arranged to project into the receptacle, and a tip of the projecting portion is arranged forward of a tip of the male terminal fitting.

5. The connector of claim 1, wherein:

either one of the first and second housings includes a deflectable and deformable lock portion for locking the mating housing and holding a connected state to the mating housing, and the projecting portion is arranged to face the lock portion in a deflecting direction of the lock portion.

6. The connector of claim 1, wherein:

the housing lock portion includes a lock body portion, the second housing includes a housing locked portion to be lockably arranged to face the lock body portion, and when the mating housing and the first and second housings are in the connected state, the housing locked portion is arranged between the housing lock portion and the projecting portion in a plan view.

7. The connector of claim 6, wherein:

the housing lock portion further includes a pair of fulcrum portions respectively connected to inner side surfaces of the first housing; and a pair of extending portions extending from the fulcrum portions, respectively, and the lock body portion links between the extending portions.

* * * * *